May 7, 1957

J. C. McCLURKIN 2,791,042

DITCHER

Filed June 30, 1953

J.C. McClurkin
INVENTOR

BY Knowles.
ATTORNEYS.

May 7, 1957 J. C. McCLURKIN 2,791,042
DITCHER
Filed June 30, 1953 3 Sheets-Sheet 2

J. C. McClurkin
INVENTOR
BY C. A. Snow & Co.
ATTORNEYS.

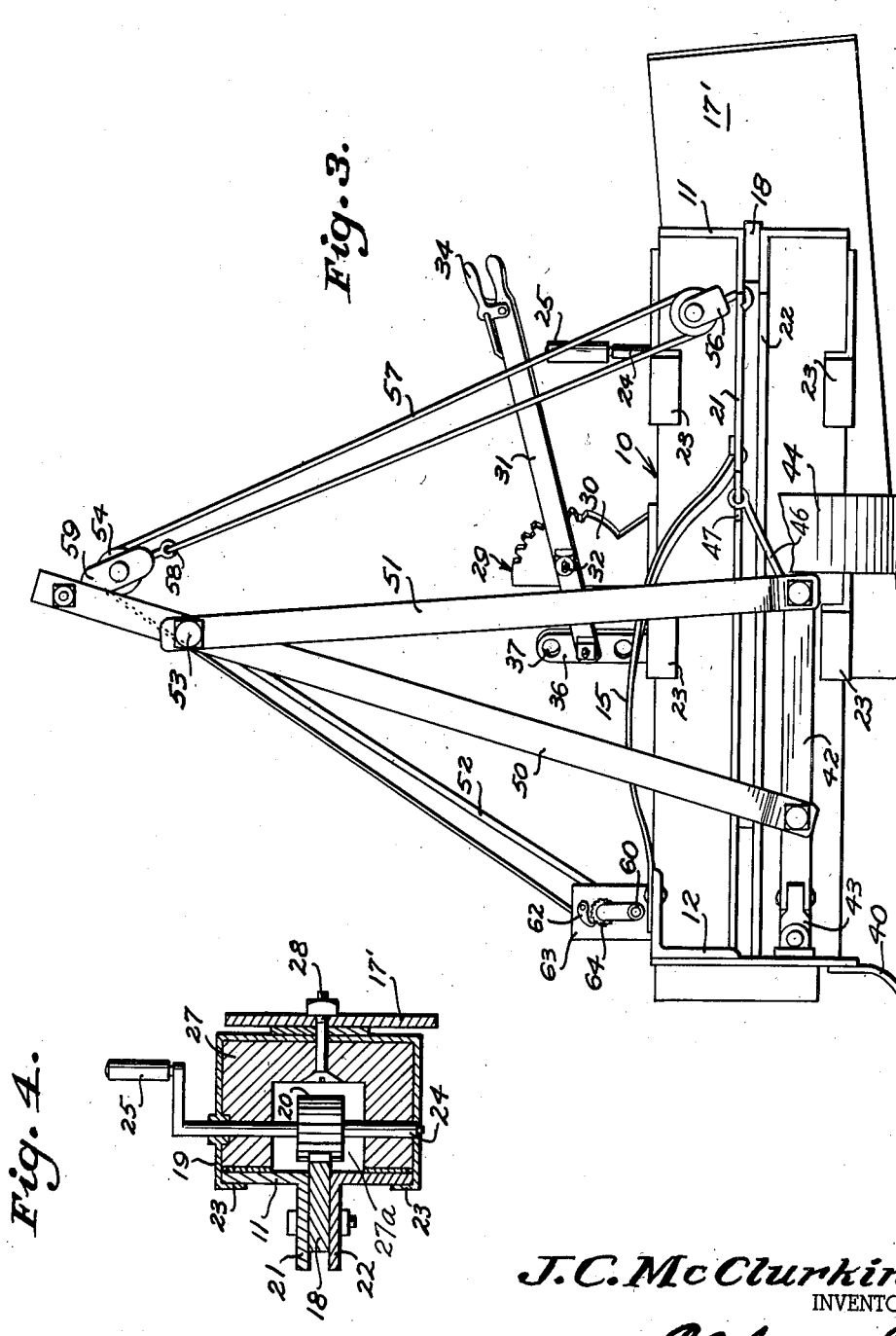

though it may be used. The other end, or outer end of the

United States Patent Office 2,791,042
Patented May 7, 1957

2,791,042

DITCHER

John C. McClurkin, Lakin, Kans.

Application June 30, 1953, Serial No. 365,125

2 Claims. (Cl. 37—98)

This invention relates to ditchers and it is an object of this invention to provide a ditcher having a moldboard with means for supporting the moldboard in a selected position relative to the ground over which the moldboard is being traversed.

Another object of this invention is to provide a ditcher of the type shown in my Patent 1,794,787, dated March 3, 1931, having means for raising one side of the ditcher for sloping the ditch at any desired angle.

A further object of this invention is to provide a ditcher for cutting ditches at a selected angle and wherein the angularity of the cutting edge or moldboard may be readily adjusted by a person operating the ditcher and may be adjusted in very small increments when desired.

Still another object of this invention is to provide a mobile frame including a moldboard adjustable relative to the ground at any selected angle and wherein the moldboard may be locked in the desired position.

Another important object of the invention is to provide an improved moldboard construction which is designed to keep weeds or the like from accumulating at the point of the moldboard.

Other and further objects and advantages of the invention will be hereinafter described and the novel features thereof defined in the appended claims.

Referring to the drawings:

Fig. 3 is an end elevation of the ditcher.

Fig. 4 is a fragmentary enlarged section taken on the line 4—4 of Fig. 2.

Figure 2:
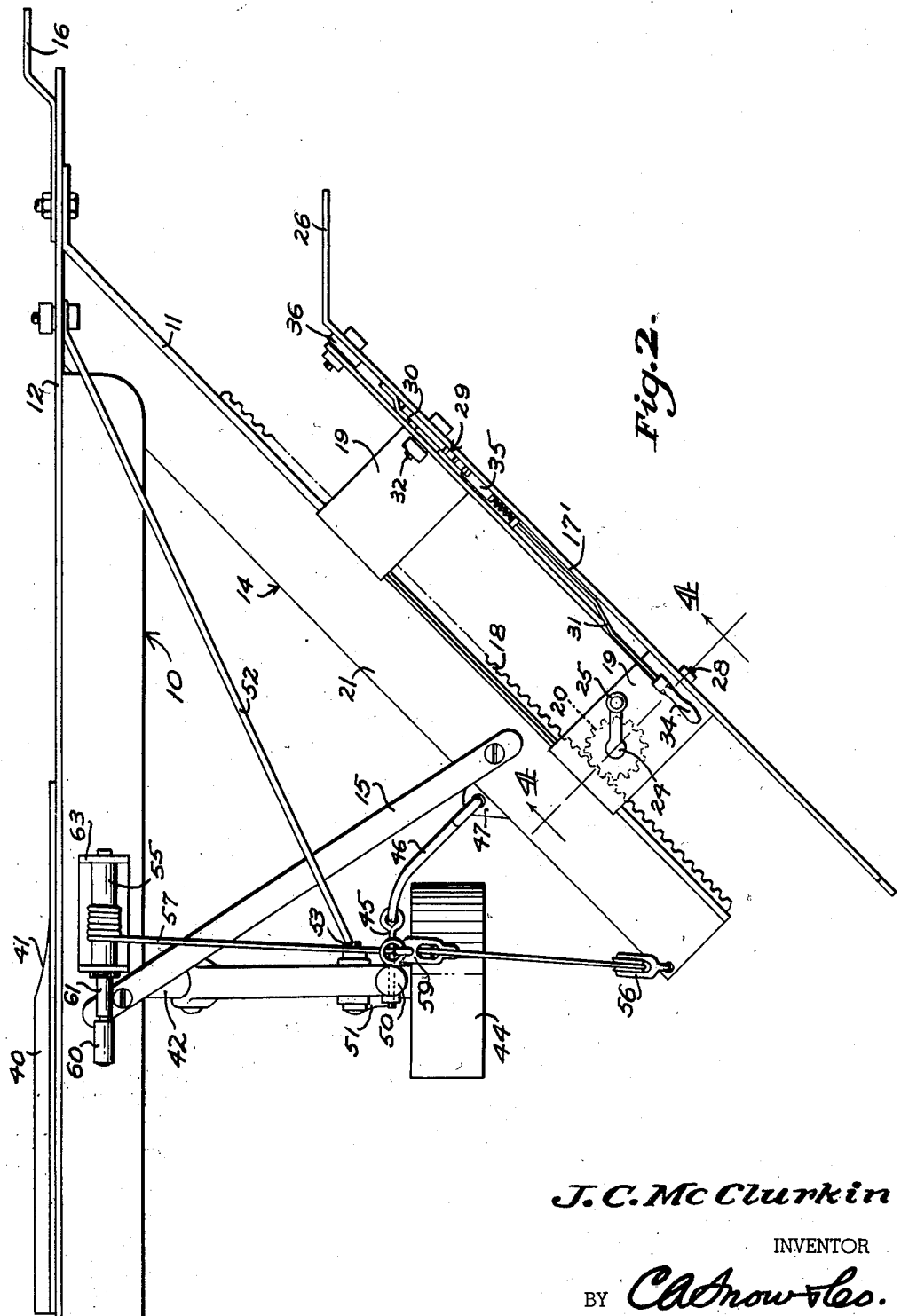
Fig. 2 is a top plan view thereof.

Referring to the drawings, the numeral 10 designates generally a ditcher constructed according to an embodiment of this invention. The ditcher 10 includes a frame 14 which is formed of a pair of side beams 11 and 12 which are rigidly secured together at their forward ends, the rear ends of the beams being divergently spread apart. One of the beams, as the beam 12, extends longitudinally with respect to the direction of travel of the ditcher 10 and beam 11 extends divergently rearwardly from the forward end of beam 12. A connecting bar 15 is rigidly secured at its opposite ends to both of the beams 11 and 12 as clearly shown in Fig. 2 of the drawings. A hitch 16 is fixedly mounted at the forward end of the frame 14 for connection with a tractor or some device for drawing the ditcher along the ground. The hitch 16 is formed with a plurality of openings 17 therein for connection to a chain or a bar which may be connected to the tractor device at its other end.

Figure 1:
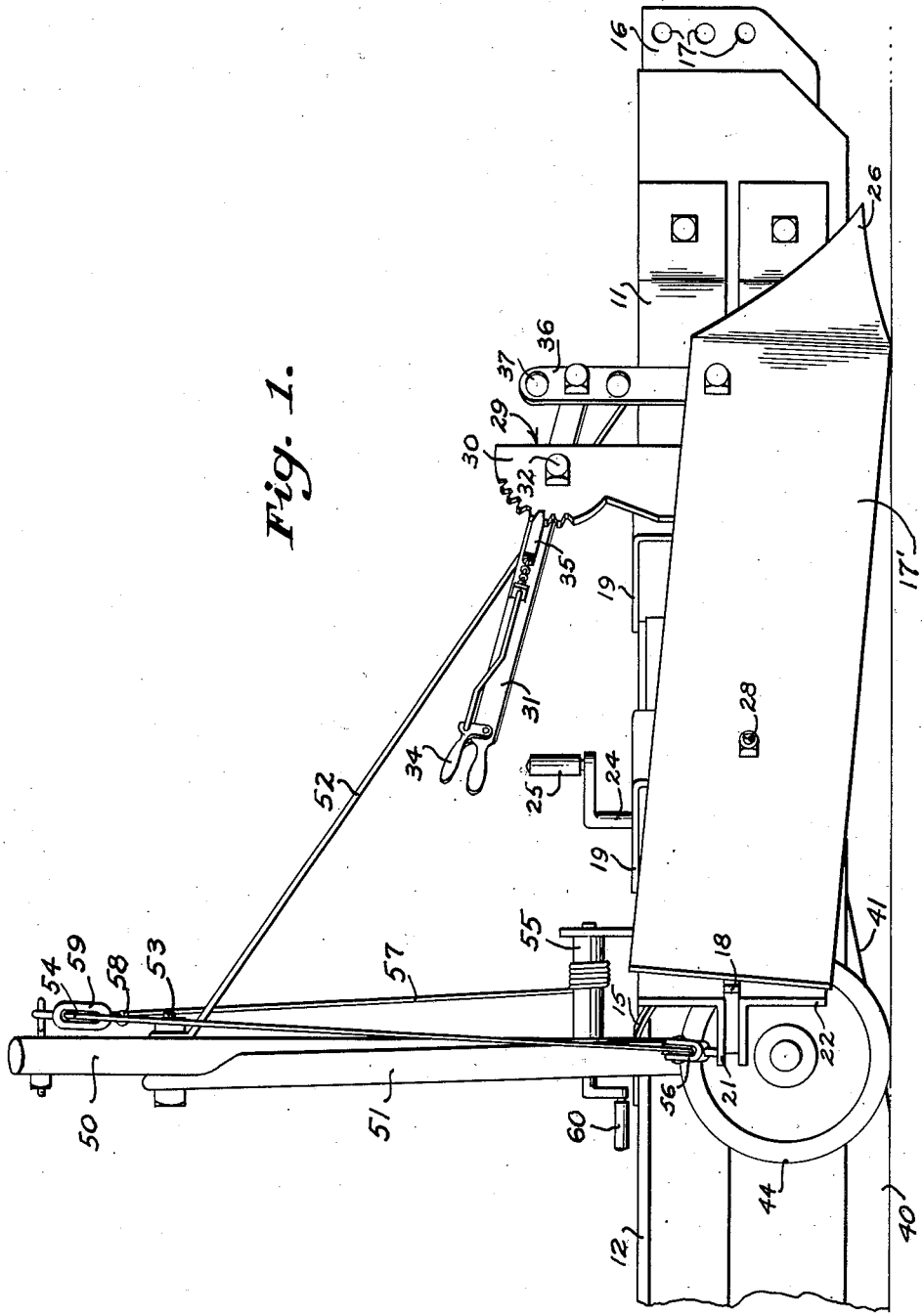
Fig. 1 is a side elevation of a ditcher constructed according to an embodiment of this invention.

A moldboard 17' is carried by the beam 11 for adjustment along the length of the beam and is spaced outwardly therefrom. A toothed rack 18 is fixedly mounted on the beam 11 and extends along the length thereof. Moldboard 17', is supported by the brackets 19 and may be adjusted along the length of the beam 11 by a toothed pinion 20 having teeth meshing with the teeth of the rack 18. The beam 11 is formed of a pair of L-shaped bars 21 and 22 which have the rack 18 secured between the horizontal sides thereof. The brackets 19 are provided with oppositely directed arms 23 which engage the opposite edges of the beam 11 for slidably supporting the moldboard 17' for movement therealong. A shaft 24 having a crank handle 25 is rotatably mounted between the brackets 19 and carries the spur gear 20 intermediate the length thereof for rotation in engagement with the gear rack 18. The forward end 26 of the moldboard 17' is inclined to a position parallel with the other beam 12 and the line of movement of the ditcher 10. The forward pointed end 26 of the moldboard 17' is provided with an upwardly curved and upwardly extending lower edge and a downwardly curved and forwardly extending upper edge as clearly shown in Fig. 1 of the drawings. The upwardly inclined lower edge and the resulting upwardly offset point on the point 26 will provide for the engagement of weeds and the like on the lower side of the moldboard and thereby provide for the removal of the accumulation of any weeds or trash from the forward edge of the moldboard. A block 27 is positioned between the moldboard 17' and beam 11 within a bracket 19 and is formed with a recess 27a in which gear 20 loosely engages, as shown in Fig. 4 of the drawings.

The moldboard 17' is pivotally supported on the rearmost of the supporting brackets 19 by a pivot pin 28 which is fixedly carried by the rearmost bracket 19 and an adjusting means 29 is provided for the forward end of the moldboard 17'.

A supporting plate 30, arcuate at its upper end is fixedly carried by the front bracket 19 and a lever 31 is pivotally mounted, intermediate the length thereof by a pivot pin 32 to the upwardly extending plate 30. A handle 34 is pivotally mounted at the rear end of the lever 31 and a locking dog 35 is slidably supported on the lever 31, intermediate its length for engagement between the teeth of the arcuate portion of the plate 30 for locking the forward end of the moldboard 17' in any selected position. An upwardly extending arm 36 is fixedly mounted to the forward end of the moldboard 17' and is provided with a plurality of openings 37 for engagement by the forward end of the lever 31 so that upon pivotal movement of the lever about the pivot pin 32 the forward end of the moldboard 17' may be placed in a slected position relative to the frame 14 and the ground on which the ditcher 10 is supported. A plowshare 40 is fixedly secured to the land side of the ditcher adjacent the rear end of the beam 12. The plowshare 40 also has a forwardly and upwardly inclined forward edge 41 to provide for its smooth engagement with the ground at the time the ditcher is moved along the ground. Due to the fact that the beam 12 extends parallel to the movement of the ditcher and the beam 12 being the largest of the beams 11 and 12 the beam 12 will provide a base for the movement of the ditcher 10 to be further described hereinafter.

An axle 42 is pivotally mounted at one end to the beam 12 for movement in a horizontal and a vertical direction as by the universal connection 43 shown in Fig. 3 of the drawings. A wheel 44 is rotatably mounted on the axle 42 between the side beams 11 and 12 for partially supporting the ditcher 10 along the ground and for easy movement of the ditcher 10 along a road when it is to be transported to a field where the ditcher 10 may be used. The other end, or outer end of the axle 42 is connected to the moldboard carrying beam 11 by a pair of links 45 and 46 which also provide for a universal movement with relation to the other beam 11. One of the links, as the link 45 is fixedly connected to the axle 42 adjacent the outer end thereof and inwardly of the wheel 44, as clearly shown in Fig. 2 of the drawings, and extends parallel to the beam 12 and the plowshare 40. The other link 46 is pivotally connected to a bracket 47 fixed to the beam 11 whereby the connection to the bracket 47 will provide for longitudinal pivotal movement of the link 46 relative to the ditcher 10. The inner end of the link 46 will be pivotally connected to the link 45 for pivot movement about a vertical axis so that the link 46 connects to the axle 42 for substantially universal movement of the axle and the wheel 44.

An upstanding mast 50 is mounted at its lower end on the axle 42. A supporting member 51 is fixed at its lower end to the axle 42 adjacent the wheel 44 outwardly from the connection of the mast 50 to the axle 42 and is fixedly connected at its upper end to the mast 50 adjacent to the upper end of the mast 50 by means of a bolt 53, as clearly shown in Fig. 3 of the drawings. A forwardly extending support 52 is fixedly mounted at its forward end to the plowshare carrying beam 12 and the rear end of the support 52 is fixedly mounted to the mast 50 adjacent the upper end thereof as by bolt 53 which extends through the upper end of the support 51 and the rearmost end of the supporting beam 52. The bolt 53 provides for the stable connection of the supporting members 51 and 52 to the upper end of the mast 50, adjacent the extreme upper end of the mast. A pulley 54 is secured to the extreme upper end of the mast 50. A winch 55 is rotatably supported on the beam 12, on the land or inner side thereof. A second pulley 56 is connected to the moldboard supporting beam 11, adjacent the rear end of the beam 11. A flexible member 57 is fixed at one end and wrapped around the winch 55 extending upwardly to the pulley 54 on the upper end of the mast 50 and then extending downwardly to be trained about pulley 56 on the rear end of the beam 11. The flexible member 57 is continued upwardly from pulley 56 and terminates in an eye 58 which is carried by the pulley block 59. A crank handle 60 is provided on the reel of the winch 55 for rotating the winch and thereby tilting the frame 14 to a selected position relative to the ground.

A ratchet wheel 64 is fixed relative to the shaft 61 and a dog 62 is pivotally mounted on the frame 63 at one end of the reel and engageable between the teeth of the wheel 64 which is rotatable with the shaft 61 for securing the winch 55 in a selected position.

In the use and operation of the ditcher 10, when the ditcher has been taken to a road or field to be provided with a ditch where the moldboard may be advantageously used, the moldboard 17' and moldboard supporting beam 11 may be adjusted relative to the beam 12 by rotating the winch 55 to its desired position and the lever 31 pivoted to its desired position. For moving the moldboard 17' longitudinally of the beam 11 and relative to beam 12, the spur gear 20 is rotated by the handle 25. By moving the lever 31 to its selected position relative to the plate 30 the forward end of the moldboard 17' may be adjusted, and for rotatably adjusting the beams 11 and 12 as a unit to its selected angular position, the winch 55 may be rotated by the handle 60, at which time the flexible member 57 will be reeled up on to the reel of the winch and held in its selected position by the dog 62 engaging in the teeth of the gear member 64. The ground engaging plowshare 40 and the wheel 44 will provide a suitable anchor for the entire structure of the ditcher 10.

While the specific details have been herein shown and described, the invention is not confined thereto and changes and alterations may be made without departing from the spirit and scope of the invention as defined in the appended claims.

I claim:

1. A ditcher comprising a frame formed of a pair of horizontal side beams connected together at the forward ends thereof and diverging rearwardly, a connecting bar fixed at its opposite ends to said beams intermediate the length thereof, a transverse axle between said beams and connected to one of said beams for universal pivotal movement, a ground engaging wheel rotatable on said axle between said beams, an upstanding mast secured at its lower end to said axle intermediate the length of said axle, a reel rotatable on said one of said beams intermediate the length thereof, a pulley adjacent the upper end of said mast, a second pulley carried by the other beam, and a flexible member wound about said reel and trained over both of said pulleys and secured at its opposite end to said first mentioned pulley whereby upon said flexible member being taken in on said reel, said beams will be rotated about the pivotal connection of said axle to said first mentioned beam, said other beam being raised about the axis of said first mentioned beam into selected angular relation with the ground.

2. A ditcher of the kind described comprising a frame formed of a pair of side beams connected together adjacent the forward ends thereof and diverging rearwardly, a connecting bar fixed at its opposite ends to said beams intermediate the length of each, an axle pivoted to one of said beams for universal movement relative thereto, a ground engaging wheel on said axle positioned between said beams, an upstanding mast on said axle intermediate the length thereof, an upstanding brace fixedly connected at one end to said axle adjacent said wheel and fixedly connected to said mast adjacent the upper end thereof, a second brace connected at one end to said mast and to substantially the forward end of said one beam, a plowshare on said one beam engaging the ground, a hitch extending from the forward ends of said beams for attachment to a ditcher moving means, a ditcher blade on said other of said beams, a reel rotatably mounted on said one beam intermediate the length thereof, a pulley on the upper end of said mast, a second pulley on said other beam, and a flexible member wound about said reel and trained over said pulleys, the extended end of said flexible member being secured to said one pulley whereby upon said flexible member being taken in on said reel, said beams will be rotated about the pivotal connection of said axle to the first mentioned beam, said other beam being raised about the axis of said first mentioned beam into selected angular relation with the ground.

References Cited in the file of this patent
UNITED STATES PATENTS

| | | |
|---|---|---|
| 1,794,787 | McClurkin | Mar. 3, 1931 |
| 2,195,631 | Post et al. | Apr. 2, 1940 |
| 2,625,754 | Morgan | Jan. 20, 1953 |